June 20, 1944.  R. H. MITCHELL ET AL  2,351,830
GROUND WORKING IMPLEMENT
Filed Aug. 6, 1942   4 Sheets-Sheet 1

FIG. 1

INVENTORS
Rollie H. Mitchell
William R. McKay
BY
ATTORNEYS

INVENTORS
Rollie H. Mitchell
William R. McKay

INVENTORS
Rollie H. Mitchell
William R. McKay
ATTORNEYS

June 20, 1944.　　R. H. MITCHELL ET AL　　2,351,830
GROUND WORKING IMPLEMENT
Filed Aug. 6, 1942　　4 Sheets-Sheet 4

INVENTORS
Rollie H. Mitchell
William R. McKay
BY

ATTORNEYS

Patented June 20, 1944

2,351,830

UNITED STATES PATENT OFFICE 2,351,830

GROUND WORKING IMPLEMENT

Rollie H. Mitchell, Huntington Park, and William R. McKay, Compton, Calif., assignors to Killefer Manufacturing Corporation, Los Angeles, Calif., a corporation of California Application August 6, 1942, Serial No. 453,908

18 Claims. (Cl. 37—169)

The present invention relates generally to ground working implements, and more particularly to implements of the class used for excavating or land leveling purposes, and has for its principal object the provision of a novel and improved ground working implement, which is particularly flexible in its application to various types of ground working operations, and yet which is simple and inexpensive although strong and durable.

One of the objects of the present invention relates to the provision of a ground working implement which can be used either for land leveling or for border building and checking, with a minimum of time and labor necessary for changing from one type of operation to the other. Ground working implements of this type are well-known to those skilled in the art and usually consist of a generally transversely disposed scraping blade which is drawn by a tractor or other draft means, with the edge in contact with the ground. When it is desired to release the dirt that is collected by the blade, a pair of supporting wheels are swung downwardly relative to the implement frame, to raise the scraping edge and deposit a pile of collected earth. These ground wheels are usually carried on supporting arms which are disposed in a trailing position behind the scraping blade when the latter is used for leveling purposes, so that the wheels roll on the ground which has just been smoothed and leveled by the blade. On the other hand, when the implement is to be used for irrigating operations, the supporting arms are connected to the scraper in such a manner that the wheels are positioned directly at each end of the scraper bowl and beyond the ends of the scraper blade, so that the wheels run on the ground at the sides of the trench that is being dug by the blade, and then when the blade is raised by swinging the wheel supporting arms downwardly, the wheels do not run over and flatten the dam or check deposited by the blade in the trench.

Since most implements of this class are provided with power actuated means for swinging the wheel supporting arms to raise the blade, it has heretofore been necessary, when changing the position of the wheels from the sides to the rear of the blade, or vice versa, to also change the connections to the power actuating device, such as a hydraulic cylinder or the like, so that the latter, when operating over its limited range of movement, could swing the wheel supporting arms through the required arc of movement.

It is one of the more specific objects of this invention, therefore, to provide a supporting and lifting mechanism for a scraper or other tool, in which the wheel supporting arms can be positioned in a forwardly or in a rearwardly extending position, selectively, without disturbing the power connections between the actuating mechanism and the wheel supporting arms. In the accomplishment of this object, the wheel supporting arms are pivotally connected to a main supporting rockshaft by means which permits the supporting arm and wheel to be swung laterally outwardly between a trailing position behind the blade and a forwardly extending position at the end of the blade. The connections of the wheel supporting arms to the rockshaft and the connections between the hydraulic cylinder and the rockshaft are so arranged that when the piston is in either extreme position within the cylinder, the wheel supporting arm can be swung about its pivotal connection with the rockshaft, from one of its extreme positions in its range for land leveling operation to the opposite extreme in its range for border building operation. Thus, by virtue of the fact that the wheel supporting arms are pivotally mounted on the rockshaft for laterally outwardly swinging movement between the two operating positions, and even though the vertical angle between the two positions of the wheel supporting arm is less than 180 degrees, the range of rocking movement of the rockshaft for one type of operation, is identical with the range for the other type of operation. Thus, the implement is raised out of operating position, when used as a land leveler, by moving the piston in one direction through the cylinder, but is raised out of operating position as a border builder, by moving the piston in the opposite direction through the cylinder. It is necessary, therefore, to use a double acting cylinder, or one in which pressure can be applied to the piston in either direction, selectively.

Another object relates to the provision of means for actuating the rockshaft to raise the implement by power obtained from the power lift mechanism of the tractor. A related object has to do with the provision of a simple but effective means for reversing the application of the power stroke to the rockshaft when the implement is converted from a leveler to a border builder and vice versa.

Another object of this invention relates to the provision of means for adjusting the blade laterally to adjust the level thereof, by angularly adjusting one of the wheels relative to the other upon the rockshaft.

Another object of the present invention relates to the provision of a novel and improved bearing mounting for the rockshaft on the rear of the scraper, providing for removing the rockshaft from the bearings in a radial direction rather than in an axial direction, since the latter would require removing the arms and actuating lever from the rockshaft before removal.

Another object of the present invention relates to the provision of adjustable side walls on the scraper bowl, so that in any position of vertical adjustment, the side edges of the bowl can be adjusted to the depth of cut of the blade, thereby compensating for the amount of longitudinal tilting of the bowl side walls because of the fact that the rear wheels raise and lower the bowl about the hitch point as a center. By adjusting the lower edges of the side walls vertically, the scraper can be made to cut cleaner irrigation ditches, which is an important consideration in irrigating work.

These and other objects and advantages of our invention will be apparent to those skilled in the art after a consideration of the following description in which reference is had to the drawings appended hereto, in which.

Referring now to the drawings, the scraper comprises a generally transverse frame 11 including a pair of longitudinally spaced transversely extending frame members 12, 13 interconnected by end frame members 14, and a draft tongue 15 extending forwardly from the forward transverse member 12. The forward end of the draft tongue 15 is provided with a coupling member 16, by means of which the forward end of the draft frame is supported on the drawbar of a tractor by means providing for lateral and vertical pivoting movement relative thereto.

The bowl of the scraper is defined by a back wall 17 and a pair of side walls 18, depending from the rectangular frame 11. The lower portion of the back wall inclines forwardly and supports, at its lower edge, a scraper blade 20, which extends transversely across the entire scraper body and is adapted to scrape the earth and accumulate the same within the confines of the back wall 17 and the side walls 18.

The rear end of the scraper is carried on a pair of laterally spaced ground wheels 21, which are journaled on axles 22 fixed at the outer ends of a pair of wheel supporting arms 23, respectively. The wheel supporting arms 23 are normally fixed at opposite ends, respectively, of a rockshaft 24, which is disposed transversely along the rear of the scraper and is journaled thereon by means of a plurality of supporting bearings 25.

Figures 7, 8, 9, 10:
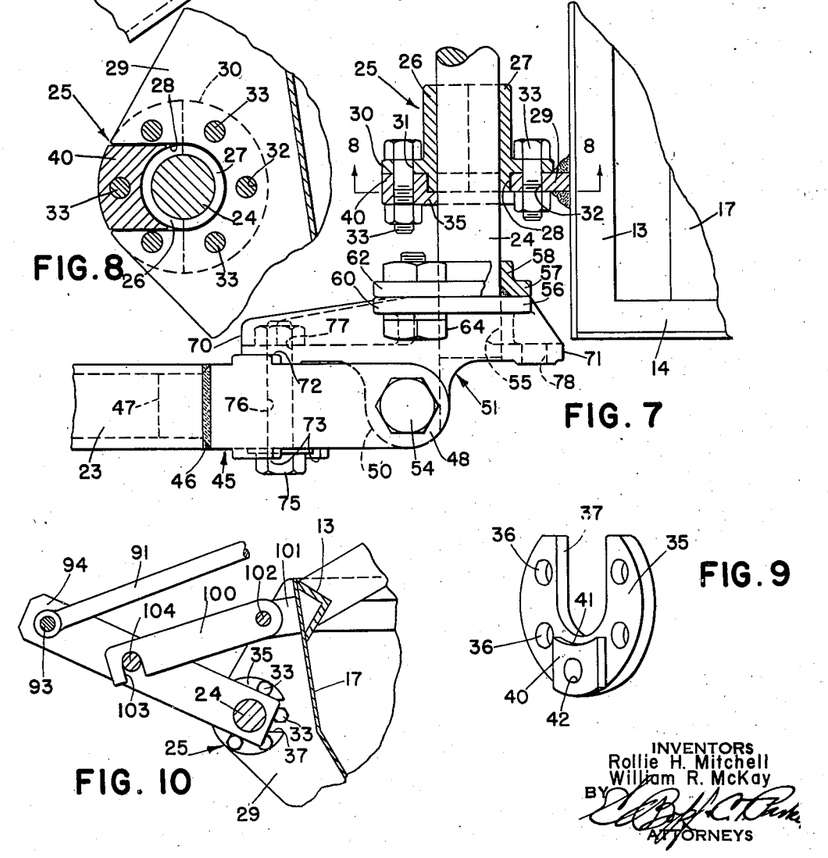
Figure 7 is a plan view, partly in section, of the bracket shown in Figure 6, and the rockshaft supporting bearing.
Figure 8 is a sectional elevational view taken along a line 8—8 in Figure 7.
Figure 9 is a perspective view of one of the parts of the rockshaft bearing assembly.
Figure 10 is a fragmentary sectional elevational view taken through the rockshaft adjacent the actuating arm on the latter.

Referring more particularly to Figures 7, 8 and 9, each of the supporting bearings 25 comprises a pair of hemicylindrical bearing sleeve members 26, 27, which embrace the rockshaft 24 and provide for rotation of the latter therewithin. One end of the bearing members 26, 27 is slidably received within a rearwardly opening slot 28 in a vertical supporting plate 29 which is fixed as by welding to the rear of the back wall 17 of the bowl. There are several of these plates 29, and they serve not only to support the rockshaft, but as stiffening members for the bowl. A securing flange 30 extends radially from the bearing members and is spaced from the end of the latter approximately a distance equal to the thickness of the plate 29. The flange 30 is adapted to lie in juxtaposition with one side of the plate 29 and is provided with a series of angularly spaced bolt holes 31, which are adapted to register with corresponding bolt holes 32 in the plate 29, so that the flange 30 of both halves 26, 27 of the bearing is rigidly fixed to the supporting plate 29 by bolts 33. A slotted collar 35 lies against the opposite face of the supporting plate 29 and has a plurality of bolt holes 36 disposed in register with the bolt holes 32 in the plate 29, and is clamped thereto by the bolts 33. The collar 35 is provided with a slot 37 adapted to slide over the rockshaft 24 from the rear, thus facing in the opposite direction to the slot 28 in the plate 29. The collar 35 is provided with a filler lug 40 adapted to fit into the outer end of the slot 28 in the supporting plate 29, having an inner curved surface 41 adapted to embrace the end of the bearing sleeve portion 26. The face of the lug 40 lies against the face of the flange 30 on the bearing member 26, and is secured thereto by one of the bolts 33, which is received within an aperture 42 in the spacing lug 40.

Thus, it is evident that the rockshaft can be readily removed from the back of the scraper by dismantling the four bearing supports 25. This is accomplished by removing the bolts 33, after which the collar 35 can be withdrawn rearwardly from the rockshaft 24, and the latter, with the bearing members 26, 27, can be slid rearwardly out of the slot 28. The bearing members can then be removed from the rockshaft by separating them. Obviously, this can all be done without disturbing the connections between the arms 23 and the rockshaft 24.

Figure 6:
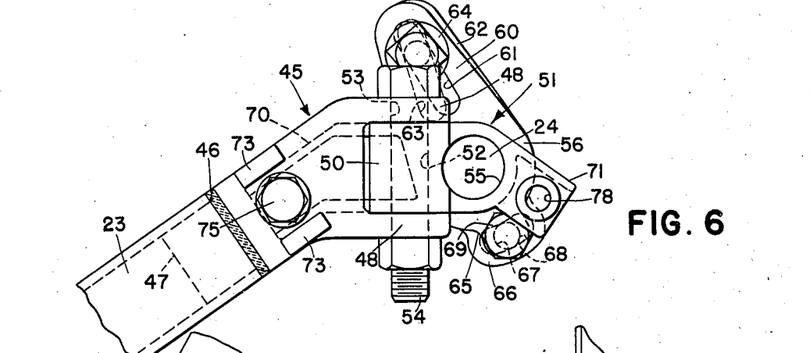
Figure 6 is a fragmentary elevational view, drawn to an enlarged scale, of the bracket which supports the wheel supporting arm.

Each of the arms 23 is in the form of a tubular member of rectangular cross section, and is rigidly secured to a connector casting 45 by welding as indicated at 46. The connector 45 has a stub shank 47 which is received within the hollow arm 23 for the purpose of strengthening the joint between the arm and the connector. The end of the connector casting 45 is provided with a pair of spaced ears 48, disposed at an angle to the longitudinal axis of the arm 23, and adapted to receive therebetween a bearing boss 50, formed integrally with a supporting bracket member 51, the bearing boss 50 being apertured at 52 in register with a pair of bolt holes 53 in the two ears 48. A pivot bolt 54 extends through the aligned apertures 52, 53 for the purpose of pivotally connecting the wheel supporting arm 23 to the bracket member 51. The bracket 51 is provided with an aperture 55, adapted to rotatably receive the end of the rockshaft 24, and the bracket 51 is provided with a flanged portion 56 in a plane radial to the rockshaft 24. This flange 56 is adapted to bear against a flange 57 on a collar 58, which is rigidly fixed, as by welding, to the rockshaft in a position spaced inwardly a short distance from the end of the latter. The flange 56 on the bracket 51 is provided with an integrally formed arm 60 extending generally radially outwardly from the axis of the rockshaft opening 55, and this arm is provided with a generally radially extending slot 61. Similarly, the flange 57 on the collar 58 is also provided with an integral arm 62, which is provided with a slot 63 extending outwardly of the arm but at an acute angle to the radial axis of the arm 62. The two arms 60, 62 are thus disposed in juxtaposition with the slots, 61, 63, therein disposed approximately in register with each other but offset angularly, so that the longitudinal axes of the slots intersect each other and are adapted to receive a securing bolt 64 passing through the two slots at their point of intersection, and since the diameter of the bolt 64 is approximately equal to the width of the slots 61, 63, but slidable therein, the bolt 64 can pass through the slots only at the point of intersection of their longitudinal axes. This point of intersection can be moved inwardly or outwardly of the arms 60, 62 by rotating the bracket arm 60 relative to the arm 62. In any position of angular adjustment, the bolt 64 can be tightened to secure the bracket member 51 rigidly to the collar 58 and therefore to the rockshaft 24. By this means, therefore, the two arms 23 can be adjusted angularly relative to each other to adjust the transverse level of the scraper blade 20.

To further secure the bracket 51 rigidly with respect to the rockshaft 24, each of the flanges 56, 57 is provided with a shorter arm 65, 66, which arms are disposed in juxtaposition on the opposite side of the rockshaft from the arms 60, 62. The arms 65, 66 are provided with a bolt hole 67 and an arcuate slot 68, respectively, which are disposed in alignment and adapted to receive a bolt 69, which is also tightened when the wheel supporting arms 23 are properly adjusted to maintain the scraper 20 level.

Each of the arm connector castings 45 is thus swingable about the longitudinal axis of the pivot bolt 54 from a trailing position behind the rockshaft 24, shown in solid lines in Figures 1-5, to a forwardly extending position, indicated in dotted lines, alongside the scraper bowl. In the rearwardly extending position, the wheels 21 are disposed on the insides of the arm 23 and are thus within the fore and aft extending vertical planes of the two ends of the scraper bowl, which is the position desired for general land leveling operations. It will be evident from Figure 1, however, that when the arms 23 are swung laterally outwardly to a forwardly extending position, the wheels 21 are positioned outwardly of the arms, and therefore outwardly of the planes of the end walls of the bowl, which is the position desired for irrigating operations, so that the wheels are in a position where they will not run over the checks or dams formed by the scraper.

In order to strengthen the connection between the connector 45 and the bracket 51, the latter is provided with a pair of stub arms 70, 71, formed integrally with the bracket 51 on opposite sides thereof, respectively. The rearwardly extending arm 70 is adapted to lie in juxtaposition with the connector casting 45 when the arm 23 is in rearwardly trailing position, while the forwardly extending stub arm 71 is adapted to lie in juxtaposition with the connector 45 when the arm 23 is in forwardly extending position. The stub arms 70, 71 are somewhat narrower than the connector 45 so that they are received between two pairs of laterally extending lugs 72, 73, formed integrally with the connector 45 on opposite sides thereof, respectively. When the arm 23 is in rearwardly extending position, the pair of lugs 72 engage the upper and lower surfaces of the rearwardly extending stub arm 70, while the opposite pair of lugs 73 engage the forwardly extending arm 71 when the wheel supporting arm 23 is in a forwardly extending position. These lugs tend to relieve the shearing stress on the pivot bolt 54 occasioned by the weight of the bowl transmitted through the bearing boss 50 to the bolt 54, as will be clear to those skilled in the art. In either position of the arm 23 the connector 45 is rigidly secured to the respective stub arms 70, 71 by means of a bolt 75, which is adapted to be inserted through a transversely disposed aperture 76 in the connector casting 45 between the upper and lower lugs of each pair 72, 73, and a suitable aligned aperture 77, 78 in the stub arms 70, 71, respectively. This bolt 75 not only aids in rigidly securing the connector to the bracket 51, but also prevents the arms 23 from pivoting about the bolt 54 during operation.

Figure 1:
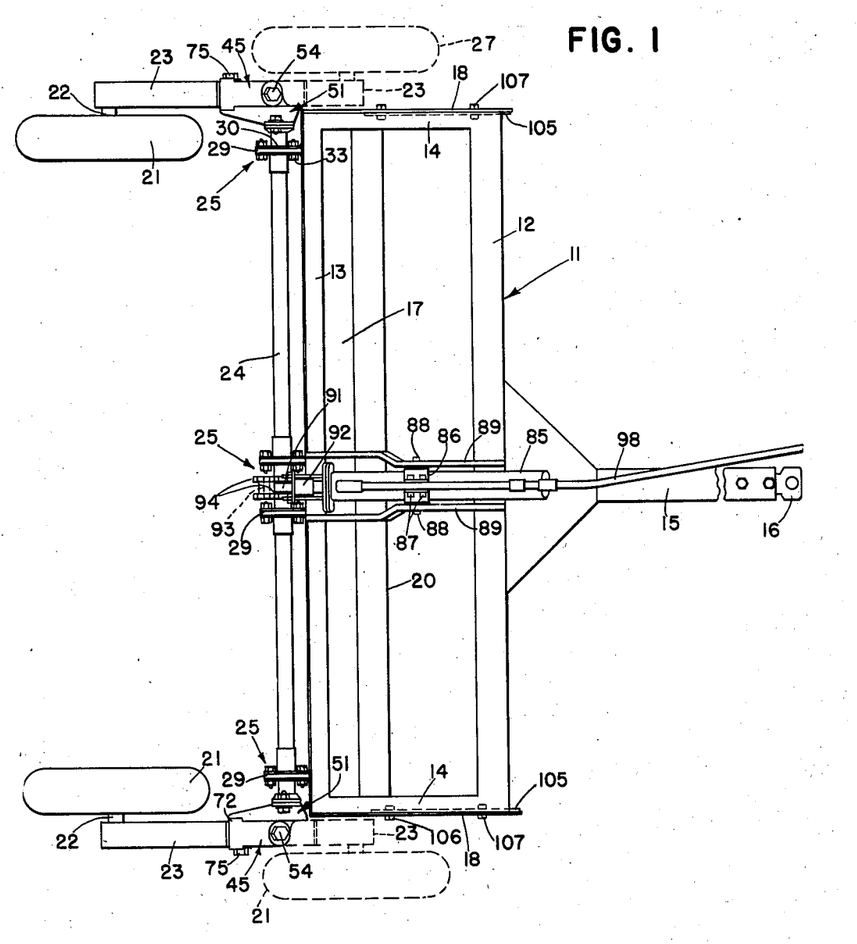
Figure 1 is a plan view of a scraper embodying the principles of the present invention, showing in solid lines the position of the wheels for ordinary land leveling work, and in dotted lines the position of the wheels for building borders.
Figure 2:
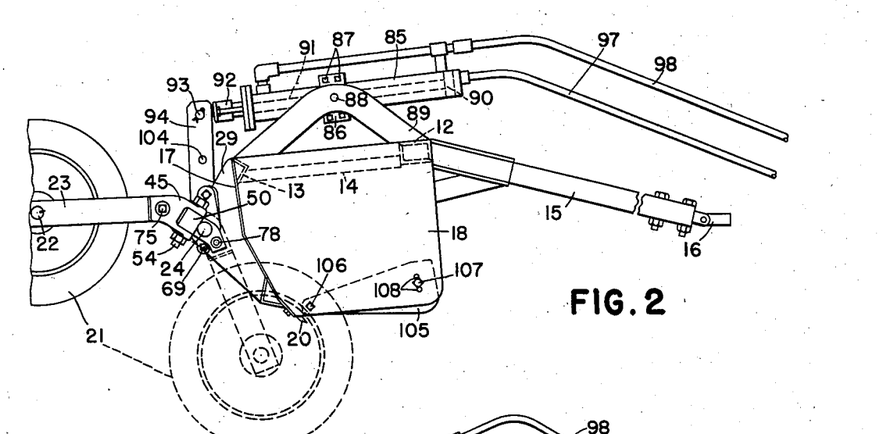
Figure 2 is a side elevational view of the scraper showing in solid lines the wheels in their raised position for maximum depth of cut in land leveling work, and in dotted lines the wheels are shown in transport position when they are set for border building work.
Figure 3:
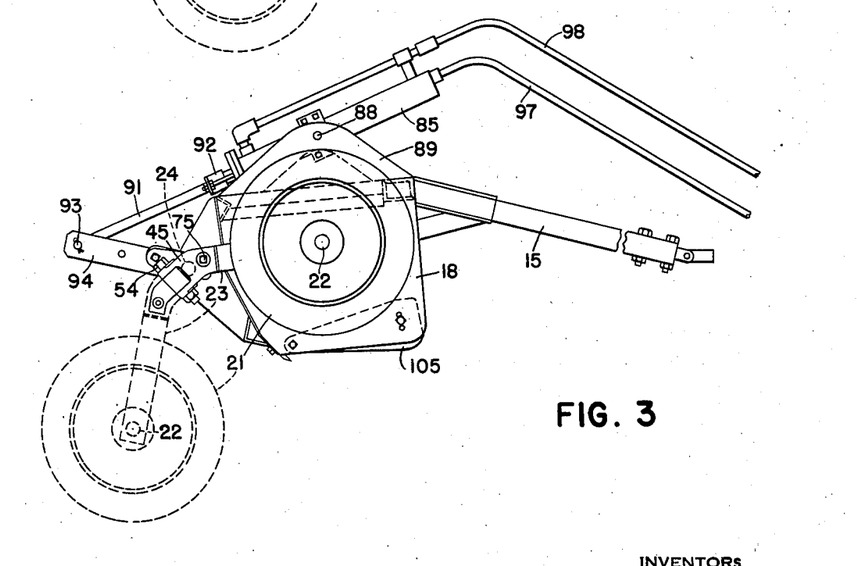
Figure 3 is a side elevational view showing the rockshaft in its opposite extreme position, in which the wheels in a rearward trailing position are forced downwardly to raise the scraper to transport position, while the corresponding border building position of the wheels is set for maximum depth of cut.

In the embodiment shown in Figures 1-3, the rockshaft 24 is swung angularly through a definite range of movement by means of a double acting hydraulic cylinder 85, which is mounted on a trunnion member 86 intermediate the ends of the cylinder 85 and comprising a pair of curved clamping plates disposed on opposite sides of the cylinder and clamped thereon by bolts 87. Each of the plates is provided with a laterally extending trunnion 88 disposed on a transverse axis to position the cylinder 85 in a fore and aft extending substantially central plane above the scraper bowl, and the trunnions 88 are rotatably carried in suitable apertures in a pair of arched beams 89. The arched beams 89 are spaced apart laterally and are supported at their front and rear ends on the fore and aft transverse frame members 12, 13, respectively. Disposed within the cylinder 85 is the usual hydraulic piston 90, connected to a connecting rod 91, the rear end of which extends out of the cylinder through a packing gland 92 and is pivotally connected by a pin 93 to an actuating arm 94 comprising a pair of laterally spaced members fixed to the rockshaft 24 and extending upwardly therefrom.

Hydraulic fluid or compressed air, preferably the former, is supplied to either the front or rear end of the cylinder 85 through a pair of supply hoses 97, 98, respectively, which extend forwardly to a suitable hydraulic pump and control mechanism (not shown) on the tractor. By means of this mechanism, the cylinder can be rocked from the position shown in Figure 2 to the position shown in Figure 3, these two positions being the extremes in the range of movement of the rockshaft, or the rockshaft can be set in any intermediate position, as is well-known to those skilled in the art. It is apparent from Figures 2 and 3 that when the piston is at the forward end of its stroke, the wheel supporting arms, when disposed in a rearwardly extending position for land leveling, are elevated to hold the wheels 21 above the ground, thus impose the weight of the wheels on the supporting arms upon the scraper blade to obtain maximum depth of penetration. The dotted line position as indicated in Figure 2, with the piston at the forward end of the cylinder 85, is the position of maximum elevation to which the bowl and scraper blade can be raised above the ground, to deposit the collected earth to form a check or dam when operating in irrigation work.

In Figure 3, the dotted lines indicate the position of the wheel and arm, when used in land leveling work, with the piston in the rear end of the cylinder, and the scraper blade at maximum elevation above the ground. As shown by the solid lines, with the rockshaft in the same position, when the wheel is swung forwardly for border building, the scraper blade is set for maximum depth of cut. Thus, it is evident that the range of movement of the piston in the cylinder, and the range of angular movement of the rockshaft are identical, whether the scraper is being used with the wheel supporting arms extending rearwardly or forwardly, and therefore no change in power connections is necessary when the wheels are shifted from one position to the other. It is also to be noted that the pivot bolt 54 is offset rearwardly from the rockshaft 24, with the result that the length of the arm is greater when the wheels are in back of the rockshaft that when the wheels are in forwardly extending position. This is desirable in order to obtain approximately the same clearance of the blade above the ground in raised position in both positions of the wheel supporting arm. This point would be more readily apparent if the true inclination of the draft frame to the hitch point with the bowl in raised position, were shown in Figures 2 and 3. In order to avoid confusion in the drawings, however, the wheels are shown in their two positions of operation, without regard for the upward tilting of the entire draft frame when the latter is raised to a dumping position.

The preferred method of changing the position of the wheel supporting arms from rearwardly extending to forwardly extending position is to first swing the rockshaft under power to approximately the midpoint of its range. At this position, the rockshaft can be locked by means of a hook arm 100 disposed substantially directly beneath the piston rod 91 and pivotally mounted on a lug 101 fixed to the rear wall 17. The hook arm 100 is supported on a pivot bolt 102 and is provided with a slot 103 adjacent its outer end, which slot is adapted to hook over a bolt 104 interconnecting the two members 94 of the rockshaft actuating arm. In this position, the pivot bolt 54 is substantially vertical, and therefore with the bowl blocked up in this half-raised position, the bolt 75 can be removed, thereby permitting the wheel supporting arm 23 and wheel 21 to be swung laterally outwardly to its oppositely extending position. Preferably, the bowl is blocked up high enough so that the wheel does not touch the ground when this conversion is made, and since the pivot bolt 54 is vertical, the wheel can be easily swung from one position to the other, after which the securing bolt 75 can be replaced in the arm and secured to the stub arm of the bracket 51.

During scraping operation, it is desirable that the forward portions of the edges of the side walls 18 are substantially on a level with the edge of the scraping blade 20, and therefore it is desirable that when the draft frame and bowl are tilted from one depth of cutting to another by means of the hydraulic power cylinder 85, an adjustment of the lower cutting edge of the side wall can be made in the following manner: A side plate 105 is provided on each of the side walls 18, at the lower portion thereof, each plate 105 being pivotally connected at its rear end by a bolt 106, providing for swinging the plate 105 vertically to adjust the lower cutting edge of the latter vertically, and the forward end of the plate 105 is secured to the side wall 18 in vertically adjusted position by means of a bolt 107, which can be inserted through a bolt hole in the forward end of the plate 105 and through one of a number of apertures 108 in the side wall 18, corresponding to several different positions of adjustment.

Figure 4:
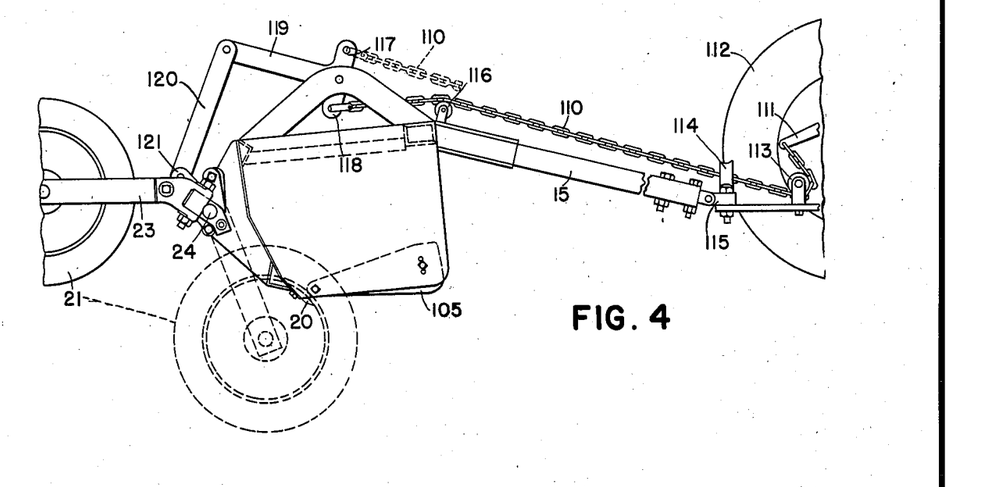
Figure 4 is a side elevational view similar to Figure 2 except that the scraper is provided with mechanism for adjusting the rockshaft through a flexible tension member connected to the power lift mechanism of the tractor, showing the scraper in scraping position as a land leveler and, in dotted lines, in transport position as a border builder.
Figure 5:
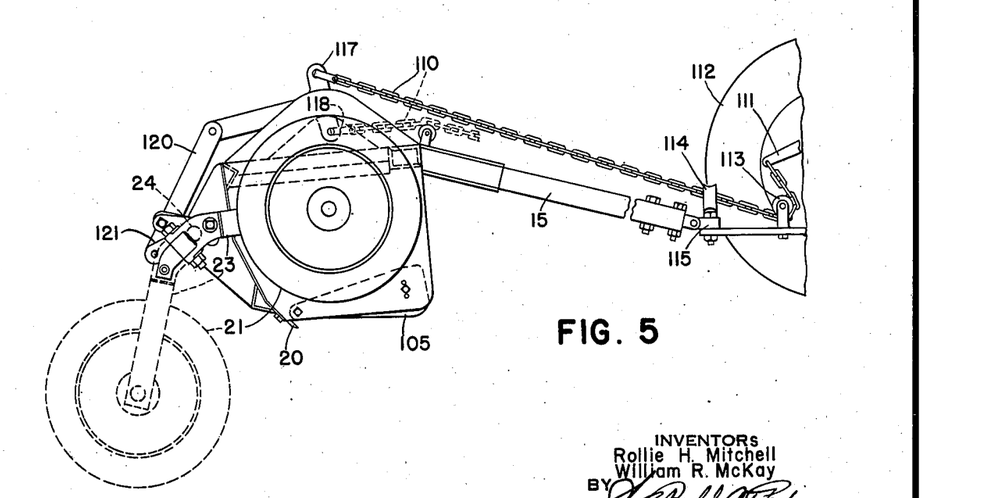
Figure 5 is similar to Figure 3, showing a scraper with tractor power lift control of the rockshaft, in transport position as a land leveler and in digging position as a border builder.

Referring now more particularly to Figures 4 and 5, it is sometimes desirable to actuate the rockshaft by means of the power lift mechanism of the tractor, rather than by a separate hydraulic power cylinder. This can be accomplished by means of a flexible power transmitting element such as a chain 110 connected at its forward end to the power lift arm 111 of the tractor 112, the chain passing downwardly over a sheave 113 rotatably mounted on the tractor body, and rearwardly therefrom through a suitable eyebolt 114 or the like mounted on the drawbar 115 of the tractor adjacent the pivot point of the hitch device 16. The chain 110 extends from there rearwardly over the draft tongue 15 and over a sheave 116 journaled on the front frame member 12 of the draft frame, and is connected at its rear end to one of a pair of arms 117, 118 on a T-shaped crank member having a rearwardly extending arm 119 swingably connected through a link 120 to an actuating arm 121 fixed to the rockshaft 24. Since the flexible chain 110 can transmit only a pull, it is evident that the chain should be connected to the upper arm 117 when it is desired to forcibly swing the rockshaft 24 in a clockwise direction as viewed in Figure 4, and to the lower arm 118 when it is desired to forcibly rotate the rockshaft 24 in a counterclockwise direction. Thus, when the wheel supporting arms 23 are extended rearwardly, it is necessary to connect the chain 110 to the lower arm 118 to transmit power from the power lift arm 111 to swing the rockshaft to raise the bowl. On the other hand, as shown in Figure 5, the chain 110 must be connected to the upper arm 117, when it is desired to raise the bowl with the wheel supporting arms 23 extending forwardly alongside the scraper, as will be apparent to those skilled in the art.

We claim:

1. In an implement of the class described comprising a frame, means for supporting one end of said frame, a rockable member mounted at the other end of said frame, and means for rocking said member, the combination of a wheel supporting arm, means swingably connecting said arm to said member providing for swinging movement laterally outwardly of said implement between a position adjacent the side of said implement and a trailing position behind said implement, and means for rigidly securing said arm relative to said rockable member in either of said positions, said implement being shiftable vertically between operating position and transport position in either position of said arm, by rocking said member.

2. In an implement of the class described comprising a frame, a ground working tool carried thereby, means for supporting the forward portion of said frame, a rockable member mounted at the rear of said frame, and means for rocking said member about a generally transverse axis through a definite range of movement, the combination of a wheel supporting arm, means swingably connecting said arm to said member providing for swinging movement laterally outwardly of said implement between a position adjacent the side of said implement and a trailing position behind said implement, and means for rigidly securing said arm relative to said rockable member in either of said positions, said implement being shiftable vertically between operating position and transport position in either position of said arm, by rocking said member through said definite range of movement.

3. In a ground scraper having a generally transverse earth scraping blade and draft means extending forwardly therefrom, the combination of a rockshaft extending transversely across the rear end of said scraper and journaled thereon, a pair of brackets fixed to said shaft at opposite ends thereof, respectively, a supporting arm at each end of said shaft, a wheel journaled on each arm, means swingably connecting said arms to said brackets, respectively, providing for swinging movement of the arms laterally outwardly of said scraper to selectively position said wheels either alongside said scraper adjacent the ends of said blade or trailing behind the latter between the ends thereof, means for fixing said arms to said brackets in either of said positions, and means for rocking said rockshaft to raise and lower said scraper.

4. In a ground scraper having a generally transverse earth scraping blade and draft means extending forwardly therefrom, the combination of a rockshaft extending transversely across the rear end of said scraper and journaled thereon, a pair of brackets fixed to said shaft at opposite ends thereof, respectively, a supporting arm at each end of said shaft, a wheel journaled on each arm, means swingably connecting said arms to said brackets, respectively, providing for swinging movement of the arms laterally outwardly of said scraper to selectively position said wheels either alongside said scraper adjacent the ends of said blade or trailing behind the latter between the ends thereof, means for fixing said arms to said brackets in either of said positions, and means for rocking said rockshaft through a definite range of movement to raise and lower said blade between scraping position at maximum depth and transport position, said swingable connecting means comprising a pivot member disposed at such an angle to the ground level with said rockshaft at either limit of rocking movement, that said wheels and arms are swingable laterally about said pivot member from a transport position in one direction to a scraping position at maximum depth in the opposite direction.

5. In a ground scraper having a generally transverse earth scraping blade and draft means extending forwardly therefrom, the combination of a rockshaft extending transversely across the rear end of said scraper and journaled thereon, a pair of brackets fixed to said shaft at opposite ends thereof, respectively, a supporting arm at each end of said shaft, a wheel journaled on each arm, means swingably connecting said arms to said brackets, respectively, providing for swinging movement of the arms laterally outwardly of said scraper to selectively position said wheels either alongside said scraper adjacent the ends of said blade or trailing behind the latter between the ends thereof, means for fixing said arms to said brackets in either of said positions, and means for rocking said rockshaft through a definite range of movement to raise and lower said blade, said swingable connecting means comprising a pivot member being disposed substantially perpendicular to the ground when said rockshaft is at the midpoint of said range of movement, whereby, with said rockshaft at either limit of rocking movement, said wheels and arms are swingable laterally about said pivot member from a transport position in one direction to a scraping position at maximum depth in the opposite direction.

6. In an implement of the class described comprising a frame, a ground working tool carried thereby, means for supporting the forward portion of said frame, a rockable member mounted at the rear of said frame, and means for rocking said member about a generally transverse axis through a definite range of movement, the combination of a wheel supporting arm, means swingably connecting said arm to said member providing for swinging movement laterally outwardly of said implement between a position adjacent the side of said implement and a trailing position behind said implement, and means for rigidly securing said arm relative to said rockable member in either of said positions, said arm extending downwardly at an acute angle to the axis of said swingable connection, whereby the vertical angle between said positions of said arm is less than 180 degrees, so that said implement is shifted vertically between operating position and transport position in either position of said arm, by rocking said member through said definite range of movement.

7. In an implement of the class described comprising a frame, a ground working tool carried thereby, means for supporting the forward portion of said frame, a rockable member mounted at the rear of said frame, and means for rocking said member, the combination of a wheel supporting arm, means swingably connecting said arm to said member providing for swinging movement laterally outwardly of said implement between a position adjacent the side of said implement and a trailing position behind said implement, and means for rigidly securing said arm relative to said rockable member in either of said positions, including bolt means adapted for insertion through aligned apertures in said arm and said rockable member, there being a recess in one of the two last mentioned parts for receiving the other to relieve said bolt means of stress in shear.

8. In an implement of the class described comprising a frame, a ground working tool carried thereby, means for supporting one end of said frame, a rockshaft journaled at the other end of the frame and means for rocking said rockshaft, the combination of a bracket fixed to said rockshaft and having a pair of oppositely extending stub arms, a wheel supporting arm, means connecting the latter to either of said stub arms, selectively, to position said wheel supporting arm either alongside said tool or spaced longitudinally therefrom, said arms having interfitting grooved means to resist relative movement between the connected arms.

9. In a ground scraper having a generally transverse earth scraping blade and draft means extending forwardly therefrom, the combination of a rockshaft extending transversely across the rear end of said scraper and journaled thereon, a pair of brackets fixed to said shaft at opposite ends thereof, respectively, a supporting arm at each end of the latter, a wheel journaled on each arm, means swingably connecting said arms to said brackets, respectively, providing for swinging movement of the arms laterally outwardly of said scraper to selectively position said wheels either alongside said scraper adjacent the ends of said blade or trailing behind the latter between the ends thereof, each of said brackets including stub arms extending forwardly and rearwardly from said rockshaft, respectively, and having bolt holes adapted to align with a bolt hole in the associated wheel supporting arm in either position of the latter, respectively, there being recessed portions on certain of said arms adapted to receive the associated arm in interfitting relation, bolts adapted for insertion in said aligned holes to clamp the interfitting arms together, and means for rocking said rockshaft to raise and lower said scraper.

10. In a ground scraper having a generally transverse earth scraping blade and draft means extending forwardly therefrom, the combination of a rockshaft extending transversely across the rear end of said scraper and journaled thereon, a pair of brackets fixed to said shaft at opposite ends thereof, respectively, a supporting arm at each end of the latter, a wheel journaled on each arm, means pivotally connecting said arms to said brackets, respectively, for swinging movement about axes perpendicular to the axis of said rockshaft and offset rearwardly therefrom, said brackets each including a pair of stub arms extending forwardly and rearwardly from said rockshaft, respectively, means for fixing said wheel supporting arms to either said forwardly or to said rearwardly extending stub arms, respectively, and means for rocking said rockshaft to raise and lower said scraper.

11. In a ground scraper having a generally transverse earth scraping blade and draft means extending forwardly therefrom, the combination of a rockshaft extending transversely across the rear end of said scraper and journaled thereon, a pair of wheel supporting brackets disposed at opposite ends of said rockshaft, at least one of said brackets being rotatable thereon and including a radially disposed ear having an outwardly extending slot therein, a bracket fixed to said rockshaft and having an ear disposed in juxtaposition with the first said ear, the second ear having a slot extending outwardly thereof and disposed at an acute angle to the slot in the first said ear, and a securing bolt extending through both slots at their intersection, whereby said rotatable bracket can be adjusted angularly relative to said fixed bracket to adjust the level of said blade by moving said bolt inwardly or outwardly in said slots.

12. In an implement of the class described, a frame, a ground working tool carried thereby, means for coupling the front end of said frame to a tractor, a rockable member mounted at the rear of said frame, a wheel supporting arm, means optionally connecting said arm to said rockable member in either a forwardly or a rearwardly extended position relative thereto, a bell crank mounted on said frame and having one arm connected with said rockable member, a flexible tension member extending forwardly along said frame to suitable pulling mechanism on the tractor, said bell crank having a pair of oppositely extending arms to which said tension member can be selectively connected, for raising said implement by power applied to said member in tension, in either position of said wheel supporting arms.

13. In a ground scraper having a generally transverse earth scraping blade and draft means extending forwardly therefrom and adapted to be supported on a tractor, the combination of a rockshaft extending transversely across the rear end of said scraper and journaled thereon, a wheel supporting arm at each end of the latter, means securing said arms to said rockshaft in either a forwardly extending position alongside the ends of the scraper blade or in rearward trailing position, selectively, an arm fixed to said rockshaft, a bell crank mounted on said frame and having one arm thereof connected with said arm fixed to the rockshaft, whereby the scraper is raised from ground working position to transport position by swinging said bell crank in one direction when said wheel supporting arms are extending forwardly and in the opposite direction when the last said arms are extending rearwardly, and a flexible tension member extending along the draft means to a suitable pulling means on the tractor, the rear end of said tension member being selectively attachable to either of two oppositely disposed arms on said bell crank.

14. In an implement of the class described having a frame, the combination of a rockable member journaled on said frame and including a bracket comprising a pair of generally oppositely extending stub arms, a wheel supporting arm pivotally mounted on said rockable member for swinging movement about an axis generally perpendicular to the axis of rocking movement of said rockable member, said wheel supporting arm being swingable into positions adjacent either of said stub arms, respectively, and means for fixedly securing said wheel supporting arm to the respective stub arm in either of said positions.

15. In combination with an implement frame, a rockable supporting member journaled on said frame by means providing for rocking movement about a transverse axis and including a pair of stub arms extending generally forwardly and rearwardly, respectively, a wheel supporting arm pivotally mounted on said rockable member for lateral swinging movement providing for swinging movement of said wheel supporting arm from a rearwardly extending position adjacent one of said stub arms to a forwardly extending position adjacent the other of said arms, and means for rigidly securing said wheel supported arm to the respective stub arm in either of said positions.

16. In combination with an implement frame, a transversely disposed rockshaft journaled thereon, a pair of brackets mounted at opposite ends of said rockshaft, respectively, each of said brackets including a pair of stub arms extending generally forwardly and rearwardly, respectively, a pair of wheel supporting arms associated with said brackets and pivotally carried on said rockshaft to be rocked thereby and individually swingable about axes generally perpendicular to said rockshaft from forwardly extending positions adjacent said forwardly extending stub arms to rearwardly extending positions adjacent said rearwardly extending stub arms, and means for rigidly securing said wheel supporting arms to the adjacent stub arms in either of said positions.

17. In combination with a frame, a rockshaft journaled thereon, a pair of wheel supporting brackets disposed at opposite ends of said shaft, respectively, at least one of said brackets being rotatable about the axis of said shaft, a member fixed to said shaft adjacent said rotatable bracket, said bracket and said member having a pair of cooperative juxtaposed slotted portions, respectively, there being a pair of crossed slots in said portions, the point of intersection being shiftable by angularly shifting said rotatable bracket on said rockshaft, and a securing bolt extending through both said slots at said intersection and adapted to retain said bracket in any position of angular adjustment relative to said member.

18. In combination with a frame, a rockshaft journaled thereon, a pair of wheel supporting brackets disposed at opposite ends of said shaft, respectively, at least one of said brackets being rotatable about the axis of said shaft, a member fixed to said shaft adjacent said rotatable bracket, said bracket and said member having a pair of cooperative juxtaposed radially extending portions, respectively, there being a pair of outwardly extending slots in said portions, said slots being disposed at an acute angle to each other in crossed relation, the point of crossing of the slots being shiftable inwardly and outwardly from the axis of said rockshaft by angularly adjusting said bracket thereon, and a securing bolt extending through both said slots at said intersection and adapted to retain said bracket in any position of angular adjustment relative to said member.

ROLLIE H. MITCHELL.
WILLIAM R. McKAY.